Dec. 4, 1962 T. H. LATIMER ETAL 3,066,907
TILTING SEAT TRACK
Filed March 11, 1959 4 Sheets-Sheet 3

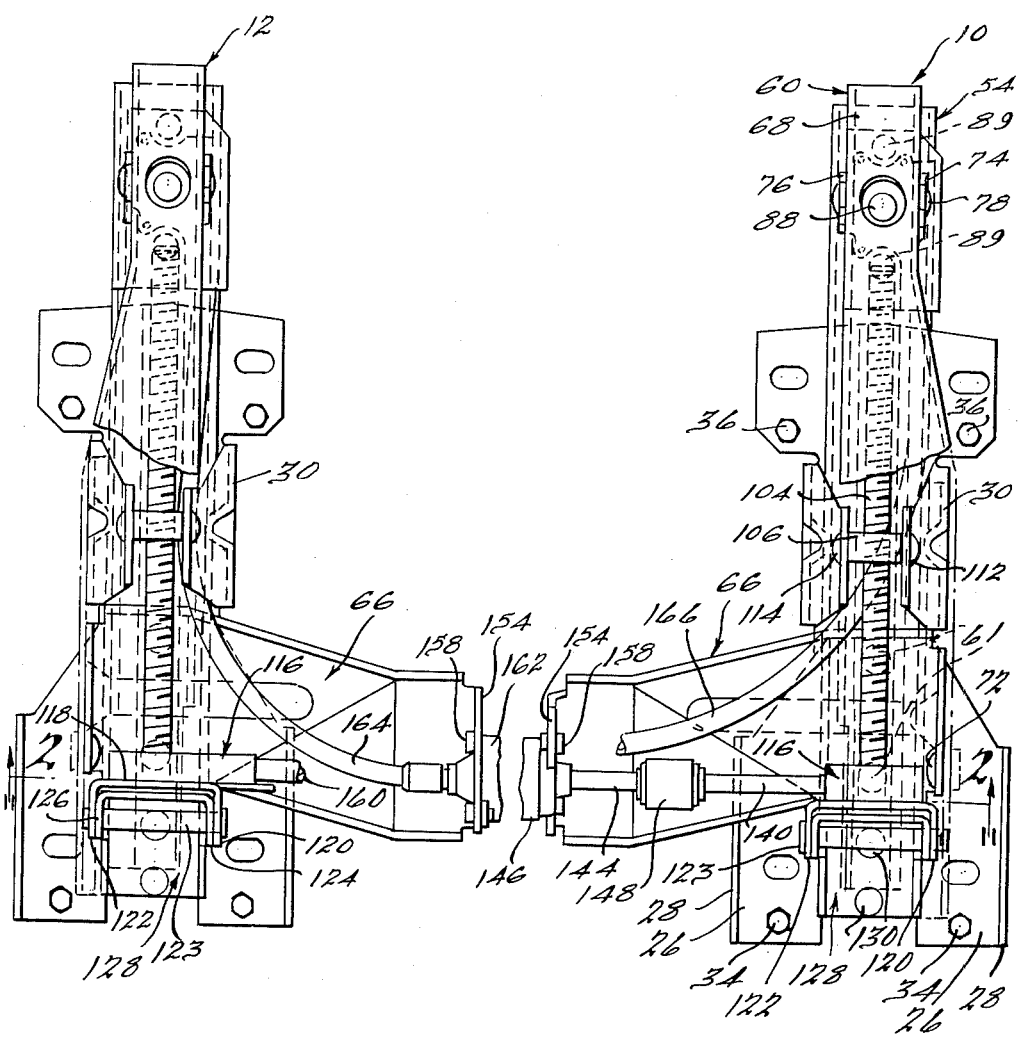

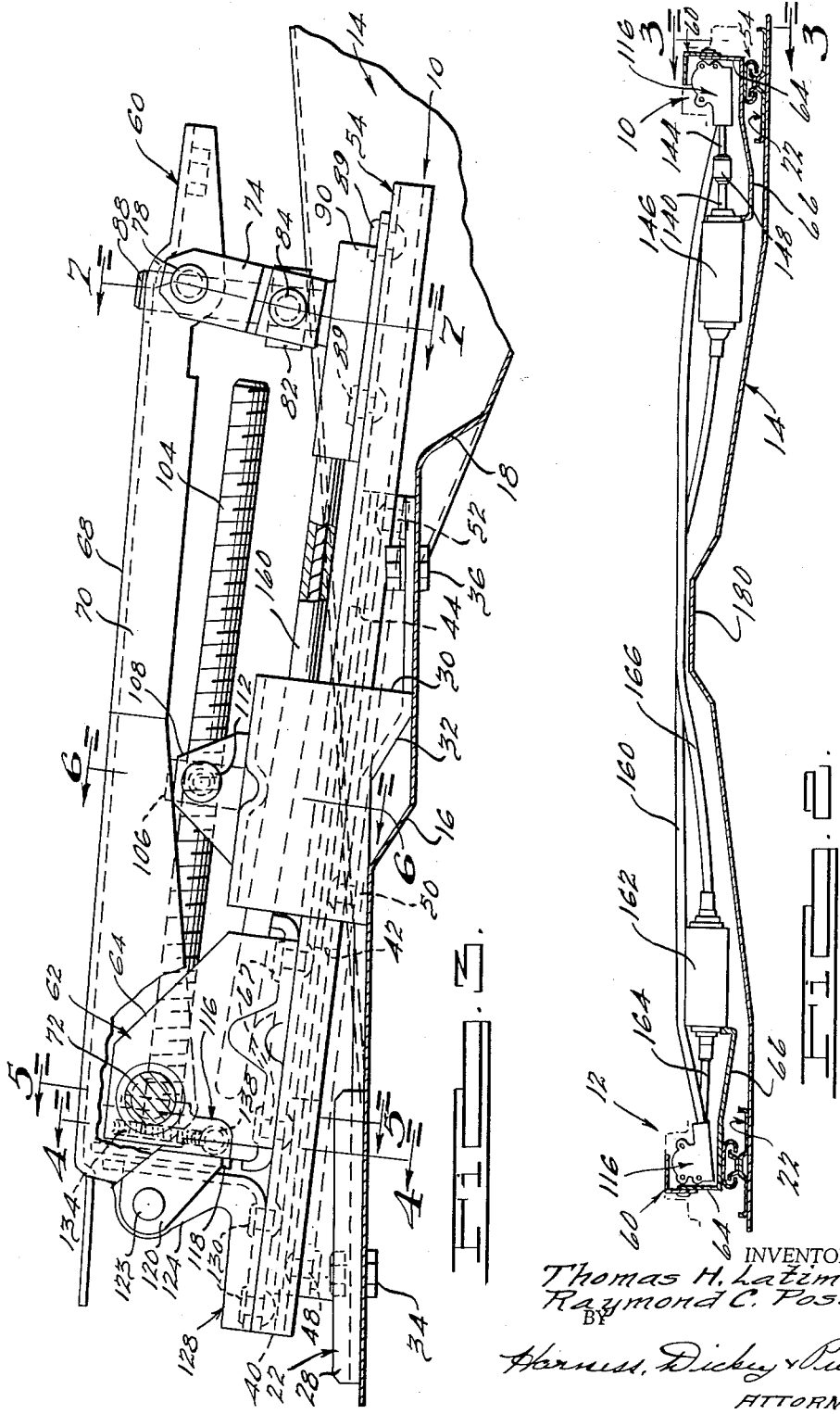

INVENTORS
Thomas H. Latimer,
Raymond C. Posh.
BY
Harness, Dickey & Pierce
ATTORNEYS.

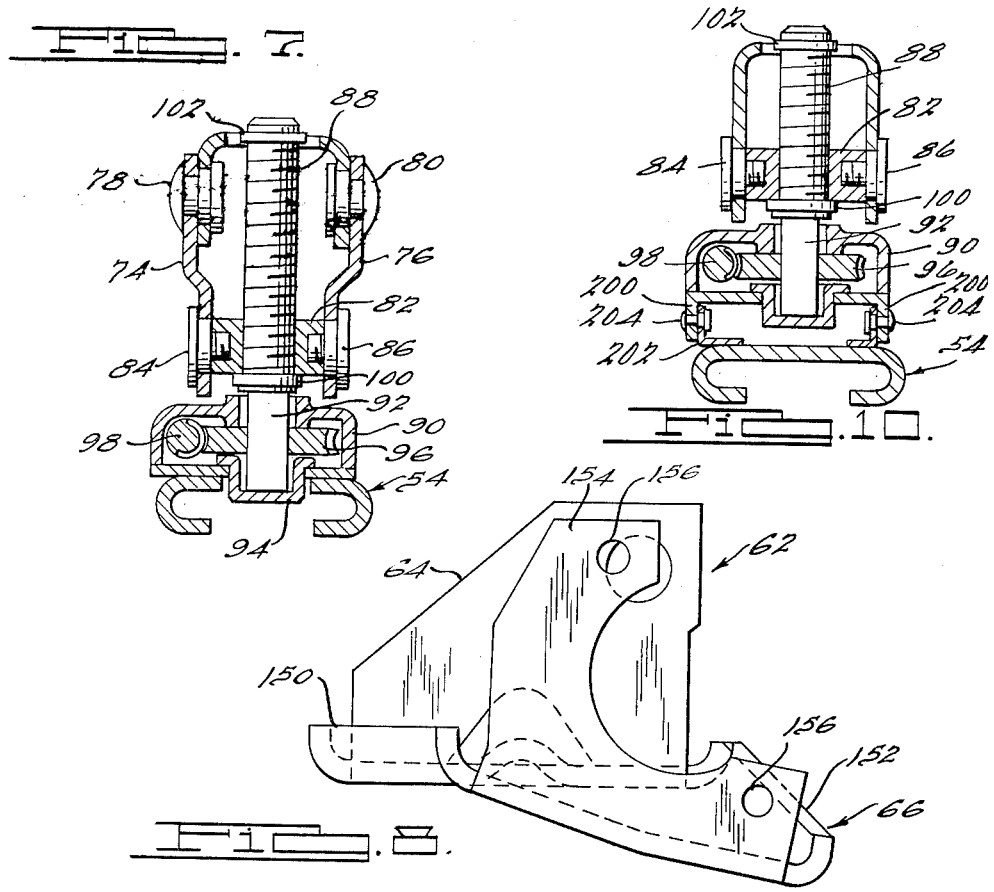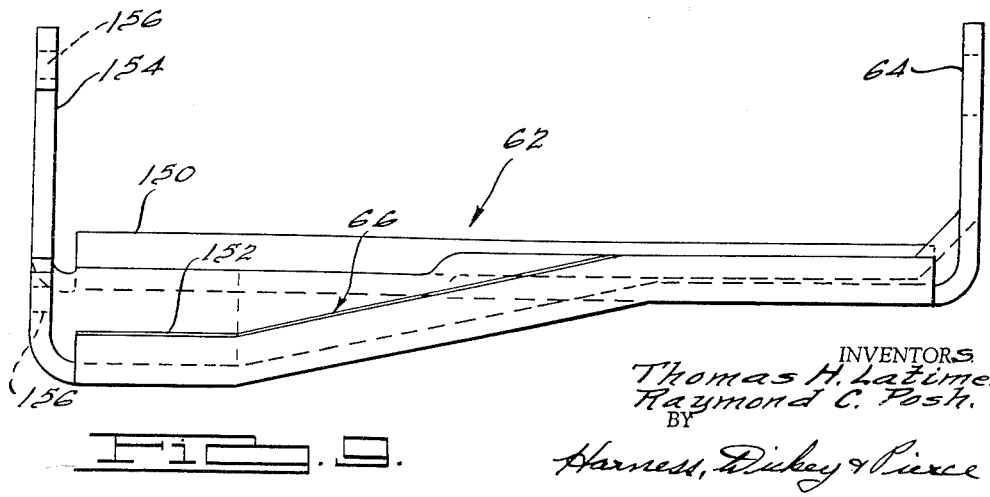

United States Patent Office 3,066,907
Patented Dec. 4, 1962

3,066,907
TILTING SEAT TRACK
Thomas H. Latimer, Birmingham, and Raymond C. Posh, Garden City, Mich., assignors to American Metal Products Company, Detroit, Mich., a corporation of Michigan
Filed Mar. 11, 1959, Ser. No. 798,785
5 Claims. (Cl. 248—420)

This invention relates to seat tracks for supporting seats and more particularly to a power-operated tilting seat rack for supporting the front seat of an automobile.

One common type of power-operated seat track employs a mechanism on one side thereof for moving the seat in the desired manner with relatively large torque tubes interconnecting the one side of the seat with the other side so that both sides are operated by the same mechanism. The torque tubes must be relatively large in diameter to operatively interconnect the sides of the seat track in this manner and consequently require a relatively large space to be maintained between the top of the raised drive shaft tunnel and the bottom of the seat. This space is an important factor in determining the over-all height of the seat and a significant reduction in the height of the seat can be made to provide the low seats required in modern-day automobiles by reducing the space between the top of the tunnel and the bottom of the seat.

Therefore, it is one object of the invention to provide a seat track that reduces the necessary space between the top of the drive shaft tunnel and the bottom of the seat to enable the over-all height of the seat to be reduced.

It is another object of the invention to provide a seat track construction having two separate side track assemblies with independent mechanisms thereon for moving the side track assemblies in the desired manner, the corresponding mechanisms on each side track assembly being simultaneously actuated by a motor disposed therebetween.

It is a further object of the invention to provide a seat track construction having spaced side track assemblies with separate lead screw mechanisms incorporated in each for actuating each of the side track assemblies in the desired manner.

It is a still further object of the invention to provide a power-operated seat track construction which is relatively simple, economical of manufacture and rugged in construction.

Other objects and features of novelty of the invention will be specifically pointed out or otherwise become apparent when referring, for a better understanding of the invention, to the following description taken in conjunction with the accompanying drawings wherein:

FIGURE 1 is a broken plan view of a tilting seat track embodying features of the invention;

FIG. 2 is a reduced sectional view of the structure illustrated in FIG. 1, taken along the line 2—2 thereof;

FIG. 3 is an enlarged sectional view of the structure illustrated in FIG. 2, taken along the line 3—3 thereof;

FIG. 7 is a sectional view of the structure illustrated in FIG. 3, taken along the line 7—7 thereof;

FIG. 8 is an enlarged end view of the motor support element of the tilting seat track of the present invention;

FIG. 9 is an elevational view of the structure illustrated in FIG. 8; and

FIG. 10 is a sectional view similar to that of FIG. 7 illustrating a modification of the invention.

Referring to FIGS. 1–3, a tilting seat track embodying features of the present invention is comprised of two parallel spaced-apart side track assemblies 10 and 12 which are fixed to a floor panel 14 which is suitably dished out or contoured as at 16 and 18 to enable the side track assemblies to be supported at an angle relative to the floor panel.

Figure 4:
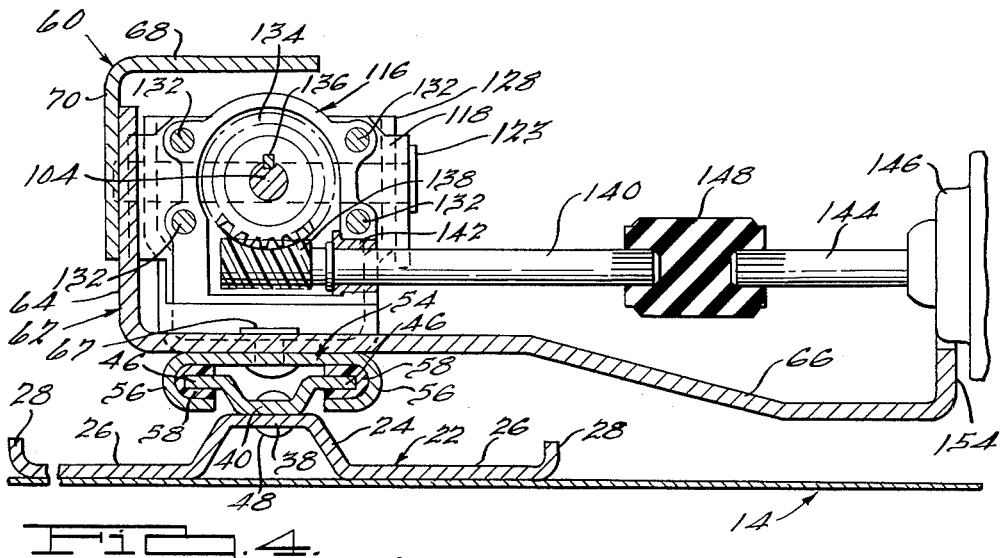
FIG. 4 is a sectional view of the structure illustrated in FIG. 3, taken along the line 4—4 thereof.
Figure 5:
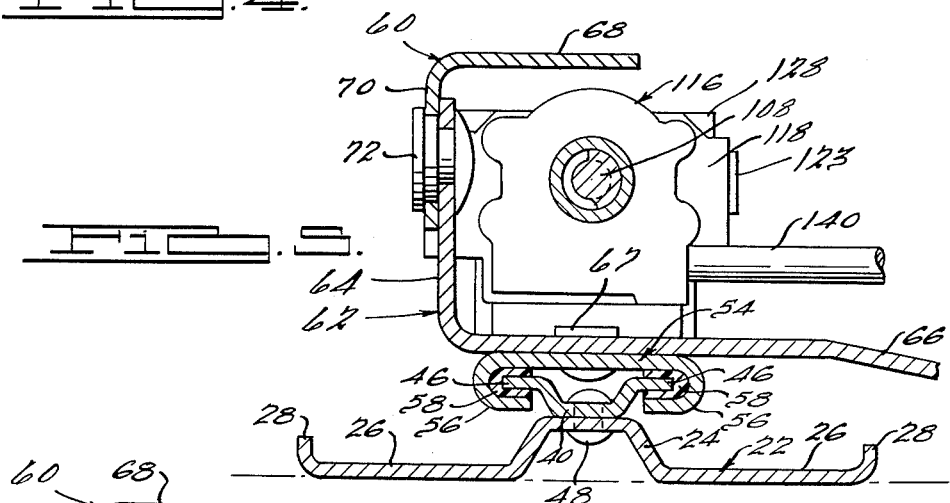
FIG. 5 is a sectional view of the structure illustrated in FIG. 3, taken along the line 5—5 thereof.
Figure 6:
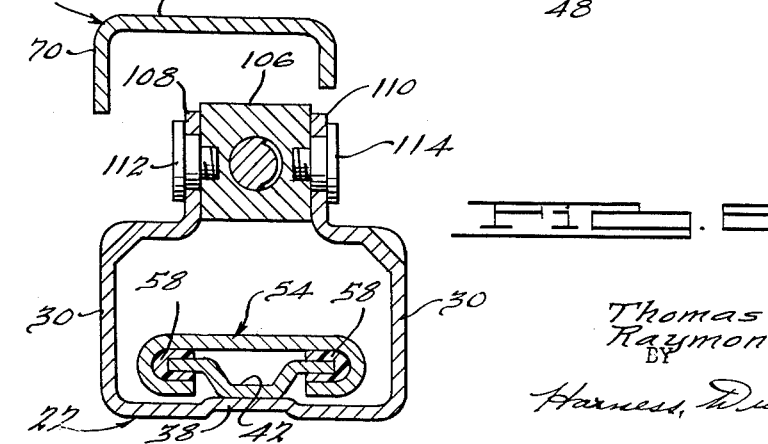
FIG. 6 is a sectional view of the structure illustrated in FIG. 3, taken along the line 6—6 thereof.

Referring also to FIGS. 4–6, each of the side track assemblies 10 and 12 are comprised of an elongated base member 22 having a raised channel-shaped central portion 24 with flanges 26 extending laterally outwardly from each of the legs and vertically extending portions 28 and 30 projecting from the edges of the flanges 26 at longitudinally spaced points, the vertical portions 28 being relatively low in height and disposed at the forward or left end of the side track assemblies as viewed in FIG. 3 and the portions 30 being greater in height and disposed intermediate the ends of the base member 22. The flanges 26 are bent as at 32 to correspond with the dished-out portion 16 of the floor panel 14 so that the flanges 26 can be secured to the floor panel by bolts 34 and 36 in a manner to enable web 38 of the channel-shaped portion 24 of the base member 22 to extend in one continuous straight line at the aforementioned angle to the floor panel 14.

Three longitudinally spaced upwardly presenting channel-shaped members 40, 42 and 44 with flanges 46 extending laterally from the ends of the legs thereof have the webs thereof fixed to the web 38 of the channel-shaped portion 24 in any suitable manner such as by rivets 48, 50 and 52, respectively. Of course, if desired, the separate channel-shaped members 40, 42 and 44 could also be made as one continuous member equally as well.

A slide member 54 is slidably mounted on the flanges 46 of the upwardly presenting channel-shaped members 40, 42 and 44 by side portions 56 which hook over the flanges 46 and are slidably supported on preformed blocks of low friction material 58 fixed to each of the flanges 46.

A seat supporting frame assembly 60 is mounted on each of the slide members 54 and is comprised of a supporting bracket 62 having a vertical portion 64 and an inwardly extending generally horizontal portion 66 mounted on the slide member 54 by rivets 67 or the like. An elongated channel-shaped seat supporting arm 68 has outer leg 70 thereof pivotally connected to the vertical portion 64 of the supporting bracket 62 by a shouldered rivet 72 in a manner to enable the arm 68 to freely pivot on the supporting bracket 62.

The rear end of the arm 68 is pivotally supported by two links 74 and 76 which are pivotally connected to the legs of the arm 68 by shoulder rivets 78 and 80. The lower ends of the links 74 and 76 are interconnected by a sleeve 82 which is pivotally supported on each of the links by shouldered screws 84 and 86, respectively, which threadably engage opposite sides of the sleeve 82 to pivotally connect it to the links 74 and 76.

The sleeve 82 threadably engages the relatively coarse thread of the lead screw 88 projecting from a gear reduction housing 90 mounted on the slide member 54 by rivets 89, or the like, so that the sleeve 82 acts as a running nut. The lower end 92 of the lead screw 88 extends within the housing 90 and is journaled in a cup-shaped bearing 94 therein and is keyed to a helical gear 96 which, in turn, is driven by a worm gear 98 as will be described hereinafter. With this construction, it will be readily apparent that rotation of the lead screw 88 will raise or lower the sleeve 82 which, in turn, raises or lowers the rear end (the right side as viewed in FIG.

3) of the arm 68 so that it pivots on the supporting bracket 62, suitable stops 100 and 102 being provided at the lower and upper ends of the lead screw, respectively, to limit the travel of the sleeve 82 on the lead screw.

To slide the seat supporting frame assembly 60 forward and back, right and left, as viewed in FIG. 3, the left end of a lead screw 104 is pivotally connected to the seat supporting frame assembly 60, as will be described, with the free end thereof passing through and threadably engaging a sleeve 106 which is pivotally connected between flanges 108 and 110 projecting from the vertically extending portions 30 of the base member 22 by shouldered screws 112 and 114 as most clearly illustrated in FIG. 6. With this construction, the sleeve 106 is pivotally fixed, and therefore rotation of the lead screw 104 will drive the seat support frame assembly 60 in a direction corresponding to the direction of rotation of the lead screw.

Referring particularly to FIGS. 1 and 3, the left or forward end of the lead screw 104 extends within a gear reduction housing 116 which, in turn, is fixed to a plate 118 having legs 120 and 122 extending forwardly therefrom. The legs 120 and 122 are pivotally connected by a pin 123 to legs 124 and 126, respectively, of an angle supporting bracket 128 having a generally channel-shaped cross section, the horizontal portion of the web of the supporting bracket 128 being fixed to the slide member 54 by any suitable means, such as by rivets 130 or the like. With this construction, it is apparent that the lead screw 104 is free to pivot about the pin 123 and the sleeve 106 is free to pivot about the screws 112 and 114 to prevent any binding between the lead screw and sleeve while transmitting the force necessary to slide each of the seat support frame assemblies 60 on the low friction blocks 58 fixed to the side track assemblies 10 and 12.

As most clearly illustrated in FIG. 4, the gear reduction housing 116 is secured to the plate 118 by a plurality of bolts 132 and the end of the lead screw 104 extending within the housing is keyed to a helical gear 134 by a key 136 or the like. The helical gear 134 is, in turn, rotated by a worm gear 138 which is driven by a shaft 140 extending through and journaled in the housing 116 by a bushing 142. The shaft 140 is coupled to an output shaft 144 of a suitable motor 146 by a connector 148, the motor 146 being fixed to and mounted on the inward end of the horizontal portion 66 of the supporting bracket 62 as will be described.

As most clearly illustrated in FIGS. 8 and 9, the horizontal portion 66 of the supporting bracket 62 has reinforcing flanges 150 and 152 along the sides thereof with the flange 152 being inclined downwardly to enable the motor 146 to be supported at a lower height. A generally C-shaped mounting bracket 154 is formed on the end of the horizontal portion 66 and has holes 156 therein to enable the motor 146 to be fastened directly to the mounting bracket 154 by bolts 158 or the like.

As most clearly illustrated in FIG. 2, a flexible drive shaft 160 extends outwardly from the other end of the motor 146 and is drivingly connected to the worm gear of the gear reduction housing 116 mounted on the other side track assembly 12. With this construction, the same motor 146 can be used to drive the lead screws 104 of each of the side track assemblies 10 and 12 to simultaneously slide each of the side track assemblies forward or back in response to the direction of rotation of the motor 146.

Referring particularly to FIGS. 1 and 2, a second motor 162 is similarly mounted on the mounting bracket 154 of the supporting bracket 62 of the side track assembly 12 for raising and lowering the seat supporting arms 68 of each of the side track assemblies. This is accomplished by a flexible drive shaft 164 which extends from one side of the motor 162 and is connected to the worm gear 98 in the gear reduction housing 90 as illustrated in FIG. 7, and by a flexible drive shaft 166 extending from the other end of the motor 162 and connected to the worm gear of the gear reduction housing 90 mounted on the side track assembly 10. With this construction, rotation of the motor 162 will rotate the lead screws 88 on each of the side track assemblies to raise and lower the rear end of the side supporting arm 68, depending on the direction of rotation which in turn raise or lower the rear portion of the automotive vehicle seat supported on the arms 68.

By employing the flexible drive shafts for transmitting the driving force of the motors to the lead screws that simultaneously operate each side track assembly, the space between the tunnel 180 (FIG. 2) and the bottom of the seat to be supported in the side track assemblies is reduced to enable the overall height of the seat to be lowered. Further, since the side track assemblies 10 and 12 each have their own independent operating mechanism, they need not be operatively interconnected in any way, such as by the prior art torque tubes, that would increase the clearance required between the seat and the tunnel 180.

Referring to FIG. 10, a modification of the present invention is illustrated wherein the housing 90 is spaced slightly above the slide member 54 and is pivotally connected thereto in a suitable manner, such as by ears 200, projecting downwardly from the bottom of the housing and pivotally connected to angle-shaped members 202 projecting upwardly from the slide member by shouldered rivets 204. By pivotally mounting the housing 90 in this manner, the floating links 74 and 76 can be eliminated, and the legs of the arm 68 can be pivotally connected directly to the sleeve 82 by the shouldered screws 84 and 86 as illustrated. The arm 68 can therefore be pivoted upwardly in the same manner, as previously described, with a more simplified construction.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

What is claimed is:

1. A seat track having a pair of parallel spaced-apart side track assemblies, each of said side track assemblies comprising an elongated base member with a raised central portion having a downwardly presenting channel-shaped cross section, an upwardly presenting channel-shaped member having the web thereof fixed to the web of said central portion of the base member, an elongated slide member slidably mounted on the legs of said upwardly presenting channel-shaped member, a mounting bracket having a vertical portion and a generally horizontal portion fixed to one end of said slide member with the horizontal portion extending toward the other of said side track assemblies, an elongated support arm having one end thereof pivotally connected to said vertical portion of the mounting bracket and extending above said slide member, a first lead screw mechanism operatively connected between said slide member and said base member so that rotation of the lead screw thereof slides said slide member relative to said base member, a second lead screw mechanism operatively connected between the other end of said slide member and the pivoting end of said supporting arm so that rotation of the lead screw thereof pivots the supporting arm, a motor mounted on the horizontal portion of the mounting bracket on each of said side track assemblies, means for connecting the end of one of said motors to said first lead screw mechanism on the same side track assembly to which the mounting bracket that supports said one motor is fixed, a flexible drive shaft for connecting the other end of said one motor to the first lead screw mechanism on the opposite side track assembly, and flexible drive shafts for connecting each end of the other said motors to each of said second lead screw mechanisms.

2. The subject matter as claimed in claim 1 wherein each of said first lead screw mechanisms comprises an upright supporting bracket mounted on said one end of said slide member, a gear reduction unit pivotally mounted on said supporting bracket, a lead screw rotatably driven by said gear reduction unit and extending therefrom between said supporting arm and slide member, a running nut threadably engaging said lead screw, and flanges extending upwardly from said base member with the upper ends thereof pivotally connected to opposite sides of said running nut, and wherein said means connects the one end of said one motor to one of said gear reduction units and said flexible drive shaft connects the other end of said one motor to the other of said gear reduction units whereby the operation of said one motor simultaneously rotates each of the lead screws to simultaneously slide each of the slide members relative to said base member.

3. The subject matter as claimed in claim 1 wherein each of said second lead screw mechanisms comprises a gear reduction unit mounted on the other end of said slide member, a lead screw extending upwardly from said gear reduction unit and rotatably driven thereby, a running nut threadably engaging said lead screw, and a pair of linkages having the lower ends thereof pivotally connected to opposite sides of said running nut with the upper ends thereof pivotally connected to the pivoting end of said support arm, and wherein said flexible drive shafts connect the ends of said other motor to said gear reduction units on each of said side track assemblies whereby operation of said other motor simultaneously rotates each of the lead screws to simultaneously pivot each of the supporting arms.

4. The subject matter as claimed in claim 1 wherein each of said second lead screw mechanisms comprises a gear reduction unit pivotally mounted on the other end of said slide member, a lead screw extending upwardly from said gear reduction unit and rotatably driven thereby, a running nut threadably engaging said lead screw, and means for pivotally connecting the pivoting end of said support arm to said running nut, and wherein said flexible drive shafts connect the ends of said other motor to said gear reduction units on each of said side track assemblies whereby operation of said motor simultaneously rotates each of the lead screws to simultaneously pivot each of the supporting arms.

5. A seat track comprising a pair of side track assemblies, each side track assembly including a seat supporting assembly slidably mounted thereon, each seat supporting assembly including a seat supporting arm pivotally mounted thereon, a lead screw mechanism operatively connected between each of said seat supporting assemblies and side track assemblies so that rotation of the lead screws thereof slides the seat supporting assembles relative to the side track assemblies, a vertically disposed lead screw mechanism operatively connected between each of said seat supporting assemblies and the pivoting end of each of said supporting arms so that rotation of the lead screws thereof pivots the supporting arms, a pair of motors, means for drivingly connecting one of said motors to each of the first-mentioned lead screw mechanisms so that rotation of said one motor rotates the lead screws thereof to simultaneously slide the seat supporting assemblies relative to the side track assemblies, a gear reduction unit on each said second-mentioned lead screw mechanism fixed to a seat supporting assembly below the pivoting end of a supporting arm, said vertically disposed lead screw extending upwardly from said gear reduction unit and rotatably driven thereby, a running nut threadably engaging said vertically disposed lead screw, a pair of linkages having the lower ends thereof pivotally connected to opposite sides of said running nut and the upper ends thereof pivotally connected to the pivoting end of the supporting arm, and means drivingly connecting said other motor to each of said gear reduction units so that the operation of said other motor rotates the lead screws to simultaneously pivot the supporting arms.

References Cited in the file of this patent
UNITED STATES PATENTS

| | | |
|---|---|---|
| 2,809,688 | Brundage | Oct. 15, 1957 |
| 2,839,124 | Desmond | June 17, 1958 |
| 2,930,428 | De Rose | Mar. 29, 1960 |